(12) United States Patent
Komaki (10) Patent No.: US 10,252,574 B2
(45) Date of Patent: Apr. 9, 2019

(54) PNEUMATIC TIRE HAVING A JOINTLESS BAND PLY AND METHOD FOR MANUFACTURING SAME

(71) Applicant: Sumitomo Rubber Industries, Ltd., Kobe-shi, Hyogo (JP)

(72) Inventor: Masashi Komaki, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 83 days.

(21) Appl. No.: 15/029,040

(22) PCT Filed: Sep. 17, 2014

(86) PCT No.: PCT/JP2014/074554
§ 371 (c)(1),
(2) Date: Apr. 13, 2016

(87) PCT Pub. No.: WO2015/060044
PCT Pub. Date: Apr. 30, 2015

(65) Prior Publication Data
US 2016/0236515 A1 Aug. 18, 2016

(30) Foreign Application Priority Data

Oct. 24, 2013 (JP) ................................. 2013-221417

(51) Int. Cl.
*B60C 9/20* (2006.01)
*B29D 30/30* (2006.01)
(Continued)

(52) U.S. Cl.
CPC ............ *B60C 9/20* (2013.01); *B29D 30/3028* (2013.01); *B29D 30/70* (2013.01); *B60C 9/02* (2013.01);
(Continued)

(58) Field of Classification Search
CPC ............ B60C 9/20; B60C 9/02; B60C 9/1835; B60C 9/2009; B60C 9/2204; B60C 15/04;
(Continued)

(56) References Cited

U.S. PATENT DOCUMENTS 4,924,927 A * 5/1990 Kawabata ............. B60C 9/2009
152/209.5
4,989,658 A * 2/1991 Maathuis ........... B29D 30/3028
152/533

(Continued)

FOREIGN PATENT DOCUMENTS

EP 0319588 A1 6/1989
EP 1396355 A1 3/2004
(Continued)

OTHER PUBLICATIONS

Wada, JP 2011-136670, Jul. 2011, machine translation.*
(Continued)

*Primary Examiner* — Robert C Dye
*Assistant Examiner* — Sedef E Paquette
(74) *Attorney, Agent, or Firm* — Birch, Stewart, Kolasch & Birch, LLP (57) ABSTRACT

To increase a restraining force to a belt layer and to improve the durability of the tire. A band layer of a spirally wound band-like ply includes: a first ply portion extending from a starting end located between the tire equator and one end in the tire axial direction of a belt layer to the one end in the tire axial direction of the belt layer; a second ply portion extending from the one end in the tire axial direction of the first ply portion to the other end in the tire axial direction of the belt layer; and a third ply portion extending from the other end in the tire axial direction of the second ply portion to a terminal end located between the tire equator and the other end in the tire axial direction of the second ply portion.

(Continued)

The band-like ply is continuous from the starting end to the terminal end without interruption.

11 Claims, 7 Drawing Sheets (51) Int. Cl.
*B29D 30/70* (2006.01)
*B60C 9/22* (2006.01)
*B60C 9/18* (2006.01)
*B60C 9/02* (2006.01)
*B60C 15/04* (2006.01)

(52) U.S. Cl.
CPC .......... *B60C 9/1835* (2013.01); *B60C 9/2009* (2013.01); *B60C 9/2204* (2013.01); *B60C 15/04* (2013.01); *B29D 2030/3078* (2013.01); *B60C 2009/1842* (2013.01); *B60C 2009/2012* (2013.01); *B60C 2009/2035* (2013.01); *B60C 2009/2067* (2013.01); *B60C 2009/2074* (2013.01); *B60C 2009/2238* (2013.01)

(58) Field of Classification Search
CPC .... B60C 2009/2012; B60C 2009/2035; B60C 2009/2067; B60C 2009/2074; B60C 2009/2238; B60C 2009/1842; B60C 9/22; B60C 9/26; B60C 9/28; B60C 9/30; B60C 2009/1857; B60C 2009/208; B60C 2009/2025; B60C 2009/2032; B29D 30/3028; B29D 30/70; B29D 2030/3078

USPC .............. 152/527, 533, 531; 156/117, 130
See application file for complete search history.

(56) References Cited

U.S. PATENT DOCUMENTS

| | | | | |
|---|---|---|---|---|
| 5,178,703 | A | * | 1/1993 | Onoda .................. B60C 9/2204 152/531 |
| 2006/0048873 | A1 | * | 3/2006 | Kudo ..................... B29D 30/30 152/209.1 |
| 2012/0180925 | A1 | | 7/2012 | Yoshikawa et al. |
| 2015/0136294 | A1 | * | 5/2015 | Lamontia .................. B60C 9/26 152/527 |

FOREIGN PATENT DOCUMENTS

| JP | 1-109108 | A | | 4/1989 | |
|---|---|---|---|---|---|
| JP | 10166820 | A | * | 6/1998 | ......... B60C 23/0493 |
| JP | 2002-19415 | A | | 1/2002 | |
| JP | 2002019415 | A | * | 1/2002 | |
| JP | 2002-46411 | A | | 2/2002 | |
| JP | 2005-247070 | A | | 9/2005 | |
| JP | 2011088490 | A | * | 5/2011 | |
| JP | 2011-136670 | A | | 7/2011 | |
| JP | 2012-144025 | A | | 8/2012 | |

OTHER PUBLICATIONS

Giza, JP 2002-046411, Feb. 2002, machine translation.*
Osamu Takahashi, JP-10166820-A, machine translation. (Year: 1998).*
Extended European Search Report, dated May 19, 2017, for European Application No. 14855491.8.

* cited by examiner

PNEUMATIC TIRE HAVING A JOINTLESS BAND PLY AND METHOD FOR MANUFACTURING SAME

TECHNICAL FIELD

The present invention related to a pneumatic tire and a method for manufacturing the same, in which, by improving a jointless ply constituting a band layer, the binding force for the belt layer is increased, and the durability of the tire is improved.

BACKGROUND ART

In a pneumatic tire, a band layer consisting of a jointless ply is formed on the outer side in the tire radial direction of a belt layer. Thereby, the belt layer is tied up to suppress lifting of the belt layer or the like, and the durability of the tire is improved. The band layer employs a structure comprising a wide full band ply which covers an approximately entire width of the belt layer, and a pair of narrow edge band plies disposed on the radially outer side of the wide full band ply and on both sides in the tire axial direction.

Heretofore, however, the full band ply and the edge band plies are separately formed by spirally winding respective band-like plies. As a result, cut ends of the band cords appear at both ends of the band layer. There is a problem such that the binding force for the belt layer can not be fully improved for that reason.

In the following Patent Document 1, it is also proposed that each end portion of a jointless ply is formed in a two-layer structure by decreasing the helical pitch of a band-like ply in each end portion of the jointless ply so that the band-like ply is partially overlapped. But, in this case too, it is difficult to fully increase the binding force because the cut ends of the band cords appear at both ends of the jointless ply.

PRIOR ART DOCUMENTS

Patent Document

Patent Document 1: Japanese unexamined Patent Publication No. 2005-247070

SUMMARY OF THE INVENTION

Problems to be Solved by the Invention

The present invention was made in view of the circumstances described above, and its primary object is to provide a pneumatic tire and a method for manufacturing the same in which the belt layer is fully tied up, and the durability is improved.

Means of Solving the Problems

A first invention is a pneumatic tire having a carcass extending from a tread portion to a bead core of a bead portion through a sidewall portion, a belt layer disposed in the tread portion and radially outside the carcass, and a band layer disposed radially outside the belt layer, and characterized in that the band layer includes a jointless ply formed by spirally winding, on the radially outside of the belt layer, a long band-like ply of one or more band cords coated with topping rubber, the jointless ply includes
a first ply portion in which the band-like ply is wound from a starting end which is positioned between the tire equator and one end in the tire axial direction of the belt layer, to a position on the one end in the tire axial direction of the belt layer,
a second ply portion in which the band-like ply is wound from the position on the one end in the tire axial direction of the first ply portion,
to a position on the other end in the tire axial direction of the belt layer,
a third ply portion in which the band-like ply is wound toward the tire equator
from the position on the other end in the tire axial direction of the second ply portion,
to a terminal end which is between the other end in the tire axial direction of the second ply and the tire equator, and
the band-like ply is continued from the starting end of the first ply portion to the terminal end of the third ply portion without interruption.

In the pneumatic tire according to the present invention, it is desirable that the side edges of the band-like ply adjacent in the tire axial direction are in contact with each other.

In the pneumatic tire according to the present invention, it is desirable that the jointless ply includes
a circumferential direction part in which the band-like ply is wound in parallel with the tire circumferential direction, and an inclined part continued from the circumferential direction part and inclined with respect to the tire circumferential direction.

In the pneumatic tire according to the present invention, it is desirable that
an inclined part of the first ply portion and an inclined part of the second ply portion disposed radially outside the first ply portion, are continued in a v-shape in the tire circumferential direction, and
an inclined part of the second ply portion and an inclined part of the third ply portion disposed radially outside the second ply portion, are continued in a v-shape in the tire circumferential direction.

In the pneumatic tire according to the present invention, it is desirable that an axially outer edge of the band layer coincides with an axially outer edge of the belt layer.

In the pneumatic tire according to the present invention, it is desirable that the axial widths of the first ply portion and the third ply portion are 10 to 60 mm.

In the pneumatic tire according to the present invention, it is desirable that the band-like ply has a width of 3.0 to 15.0 mm, and a thickness of 0.6 to 1.5 mm, and
an elongation of the band cord at a load of 66 N is 0.7% to 22.0%.

A second invention is a method for manufacturing the pneumatic tire according to any one of claims 1 to 6, which includes a band layer forming step in which the band-like ply is spirally wound on the radially outside of the belt layer,
the band layer forming step includes a first step of forming the first ply portion, a second step of forming the second ply portion after the first step, and a third step of forming the third ply portion after the second step, and the forming is made by the use of the band-like ply which is continuous from the starting end of the first ply portion to the terminal end of the third ply portion.

Effect of the Invention

The pneumatic tire according to the present invention has a band layer comprising a jointless ply formed by spirally winding, on the radially outside of the belt layer, a long band-like ply of one or more band cords coated with topping rubber. The jointless ply includes the first ply portion in which the band-like ply is wound from the starting end which is positioned between the tire equator and one end in the tire axial direction of the belt layer, to the position on the one end in the tire axial direction of the belt layer, the second ply portion in which the band-like ply is wound from the position on the one end in the tire axial direction of the first ply portion, to the position on the other end in the tire axial direction of the belt layer, and the third ply portion in which the band-like ply is wound toward the tire equator from the position on the other end in the tire axial direction of the second ply portion, to the terminal end which is between the other end in the tire axial direction of the second ply and the tire equator.

Therefore, both sides in the tire axial direction of the belt layer are covered with two plies of the band layer, and the lifting or the like of the belt layer is suppressed.

Accordingly, the durability of the tire is improved.

Further, the band-like ply is continuous from the starting end of the first ply portion to the terminal end of the third ply portion without interruption. Therefore, at both ends of the jointless ply, the band cords are continued without interruption, and thereby, the binding force of the belt layer is further increased, and the durability of the pneumatic tire is further improved.

MODE FOR CARRYING OUT THE INVENTION

Hereinafter, an embodiment of the present invention will be described based on the drawings.

Figure 1:
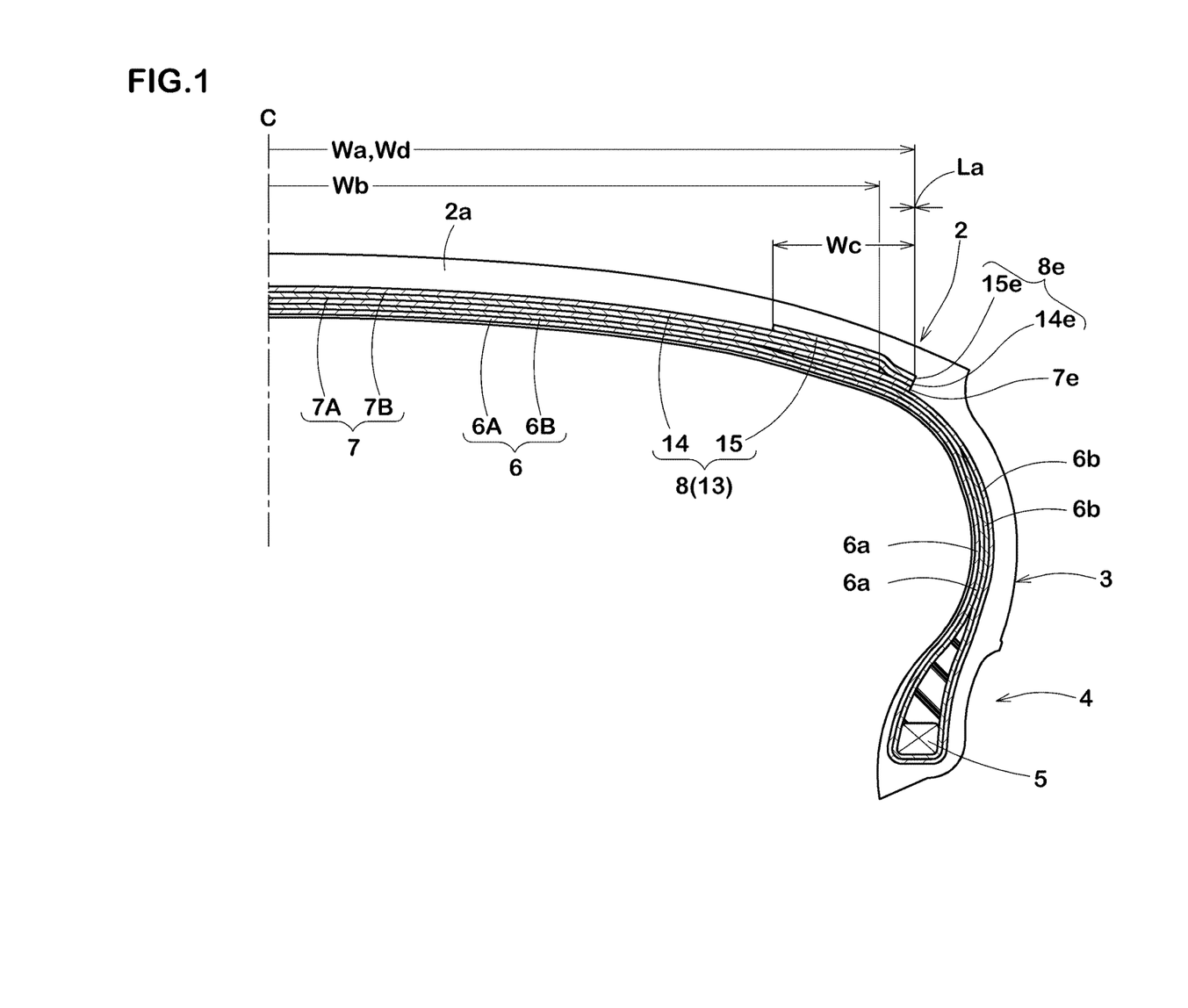
FIG. 1 a cross-sectional view of a right half of a pneumatic tire as an embodiment of the present invention FIG. 2 a perspective view showing an example of the band-like ply FIG. 3 a developed plan view of the band layer in this embodiment FIG. 4 A-A sectional view of FIG. 3

FIG. 1 is a tire meridian cross-sectional view of a right half of a pneumatic tire (hereinafter, simply referred to as "tire") including the tire axis under a regular state showing an embodiment of the present invention.

The regular state is a no-load state of the tire mounted on a normal rim and applied by a normal inner pressure.

Hereinafter, unless otherwise noted, the dimensions of the respective parts of the tire means values measured under the regular state.

The "normal rim" is a rim specified for the tire by a standard included in a standardization system on which the tire is based, for example, the "normal wheel rim" in JATMA, "Design Rim" in TRA, and "Measuring Rim" in ETRTO.

The "normal inner pressure" is air pressure specified for the tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

If there is no applicable standard as in a racing tire for example, the rim and air pressure recommended by the manufacturer are employed as the normal rim and the normal inner pressure.

In FIG. 1, there is shown a slick type racing tire for running at circuit.

Incidentally, the tire of the present invention is not limited to the racing tires, and is employed as a passenger car tire or a heavy duty tire for truck and bus for example.

As shown in FIG. 1, the tire in this embodiment has a carcass 6 extending from a tread portion 2 to a bead core 5 in a bead portion 4 through a sidewall portion 3, a belt layer 7 disposed radially outside the carcass 6 and in the tread portion 2, and a band layer 8 disposed radially outside the belt layer 7.

The carcass 6 is composed of at least one carcass ply. The carcass 6 in this embodiment is formed from two superimposed radially inside and outside carcass plies 6A, 6B.

Each carcass ply 6A, 6B has a main portion 6a spanning between a pair of the bead cores 5 and 5 in a toroidal shape, and a folded portion 6b continued from each side of the main portion 6a and folded back around the bead core 5 from the inside to the outside in the tire axial direction.

Each carcass ply 6A, 6B is a cord ply in which carcass cords are coated with topping rubber.

The carcass cords are arranged at an angle of, for example, 70 to 90 degrees with respect to the tire equator C.

As the carcass cords, an organic fiber cord selected from, for example, aramid, polyethylene naphthalate (PEN), nylon, rayon and the like is preferably used.

The belt layer 7 is composed of at least one belt ply of belt cords arranged and inclined at an angle of, for example, 16 to 90 degrees with respect to the tire equator C.

The belt layer 7 in this embodiment is formed from two superimposed radially inside and outside belt plies 7A, 7B. The belt cords of the belt plies 7A, 7B are superimposed in directions intersecting with each other.

As the belt cords, for example, steel cords, aramid cords or the like are preferably used.

Such belt layer 7 tightly hoops the carcass 6 and increases the rigidity of the tread portion 2, thereby improving the durability.

Both of the belt plies 7A, 7B in this embodiment extend to near the sidewall portions 3 on both sides.

In this embodiment, the inside belt ply 7A is formed to be wider in comparison with the outside belt ply 7B.

The axial widths Wa, Wb of the respective belt plies 7A, 7B are not to be limited particularly, but preferably about 250 to 400 mm. The difference Wa−Wb of the axial width Wa of the inside belt ply 7A and the axial width Wb of the outside belt ply 7B is preferably is not more than 10 mm.

For example, the belt layer 7 may have a so-called fold structure (not shown) in which both sides in the tire axial direction of the inside belt ply 7A are folded back toward the tire equator C, and the folded-back portions are superimposed on the radially outside of the outside belt ply 7B.

The band layer 8 is formed from a band-like ply 13 in which band cords 9 (shown in FIG. 2) are arranged at an angle of not more than 5 degrees with respect to the tire circumferential direction.

The band ply 13 in this embodiment is composed of a full band ply 14 covering the entire width of the belt layer 7, and a pair of edge band plies 15, 15 disposed in both sides in the tire axial direction of the full band ply 14.

Figure 2:
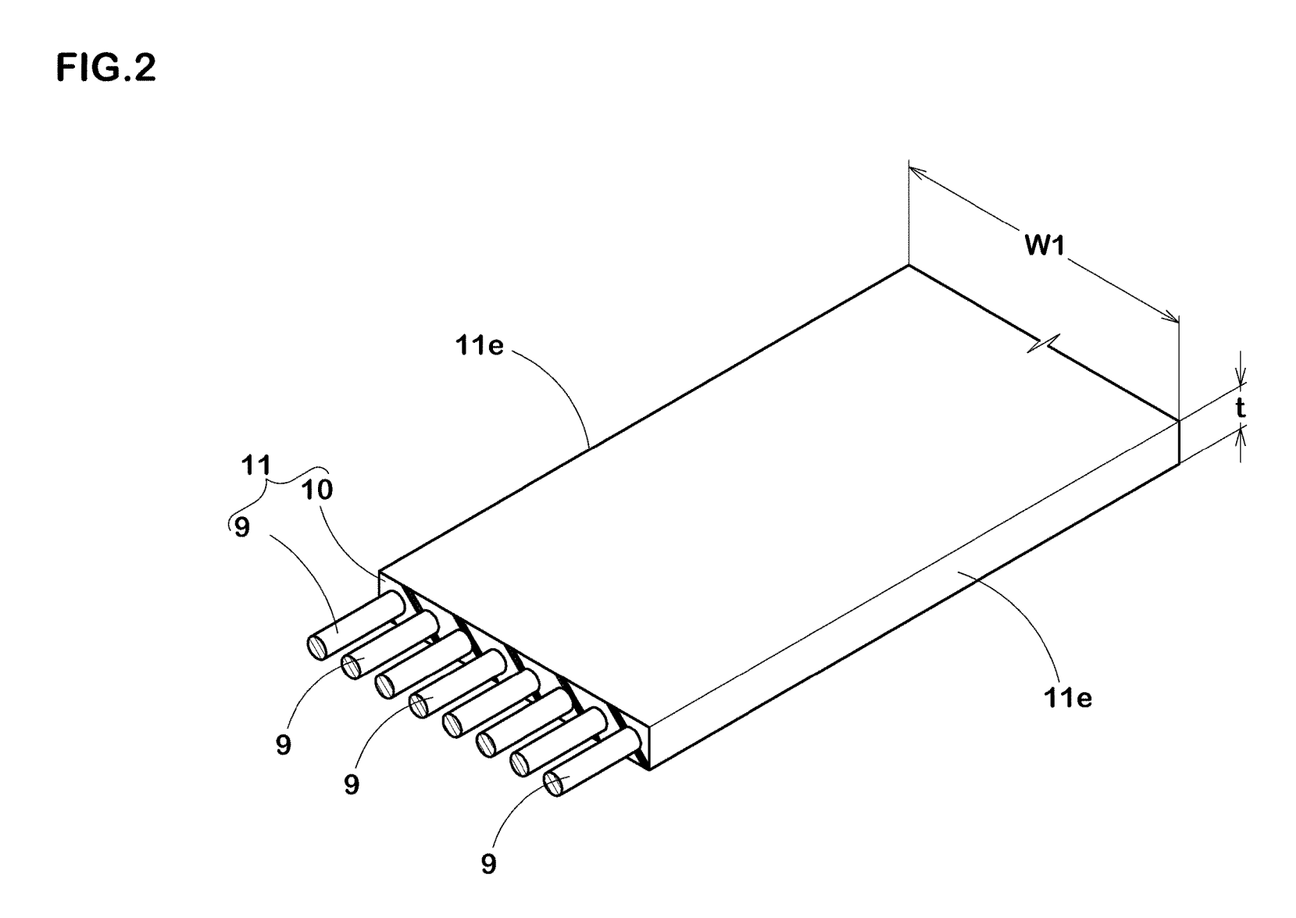

As the band cords 9, for example, organic fiber cords such as Kevlar, nylon, rayon and PEN are preferably used. Preferably, the elongation of the band cord 9 at a load of 66 N is 0.7% to 22.0%. Thereby, the band layer 8 provides a large binding force for the both sides in the tire axial direction of the belt layer 7 in particular, and suppresses the lifting of the belt layer 7 and the like to improve the durability.

In this embodiment, the axially outer edge 8e of the band layer 8 coincides with the axially outer edge 7e of the belt layer 7.

If the outer edge 8e of the band layer 8 is placed on the tire equator C side of the outer edge 7e of the belt layer 7, there is a possibility that the binding force of the band layer 8 to the belt layer 7 is decreased.

If the outer edge 8e of the band layer 8 is placed axially outside the outer edge 7e of the belt layer 7, there is a possibility that the band layer 8 protruding axially outwardly from the belt layer 7 becomes a starting point of cracking due to rolling of the tire.

The outer edge 8e of the band layer 8 coinciding with the outer edge 7e of the belt layer 7 means that the outer edge 8e of the band layer 8 completely coincides with the outer edge 7e of the belt layer 7, and that the axially distance La between the outer edge 8e of the band layer 8 and the outer edge 7e of the belt layer 7 is 1.5 mm or less.

In this embodiment, both of the axially outer edges 14e, 14e of the full band ply 14 and the axially outer edges 15e of the edge band plies 15 coincide with the outer edges 7e of the inside belt ply 7A.

Figure 3:
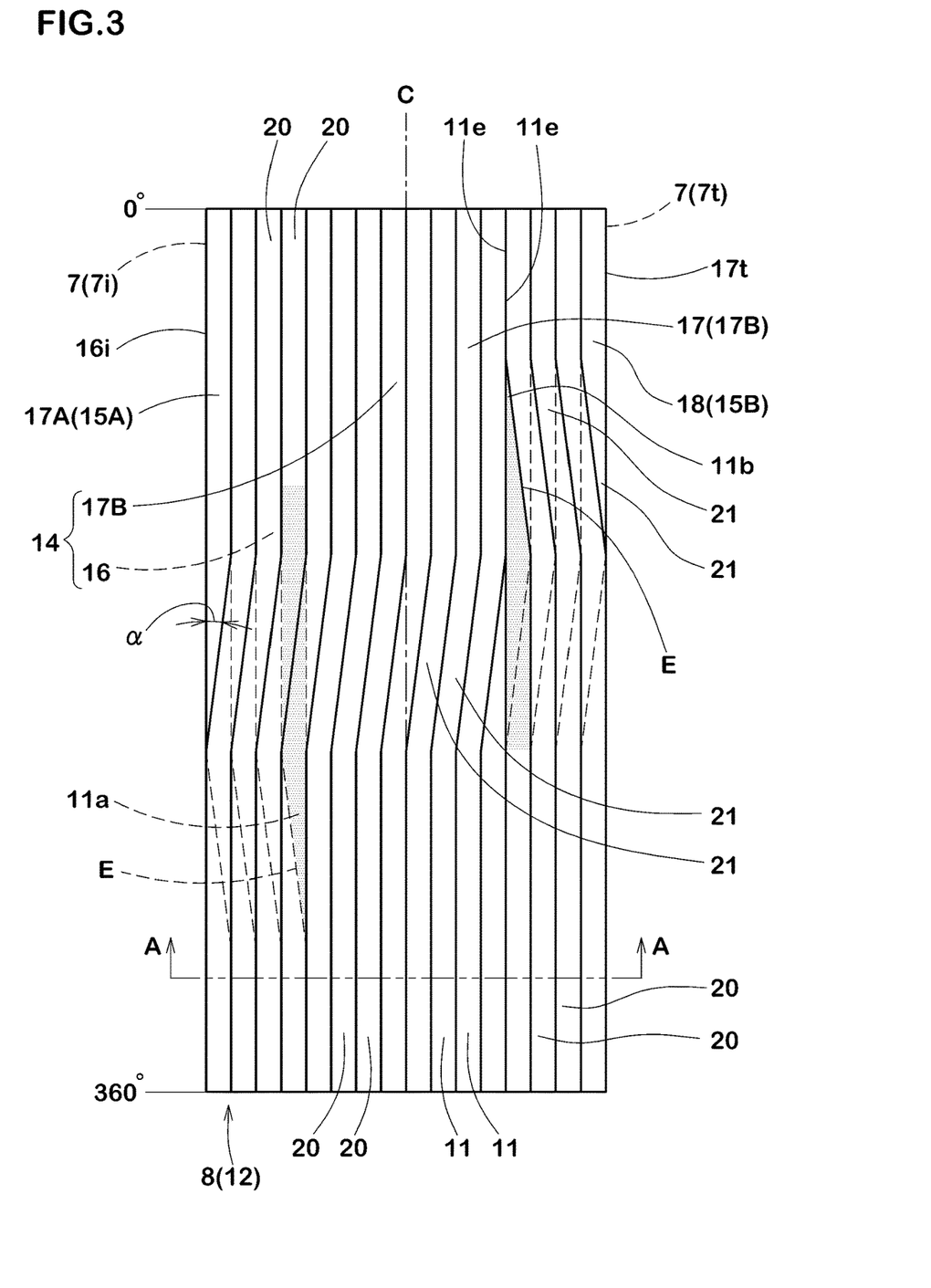

In FIG. 3, there is shown a figure in which the band layer 8 is developed into a plane taking the tire circumferential direction as the vertical axis and the tire axial direction (the widthwise direction of the belt layer) as the horizontal axis.

Figure 4:
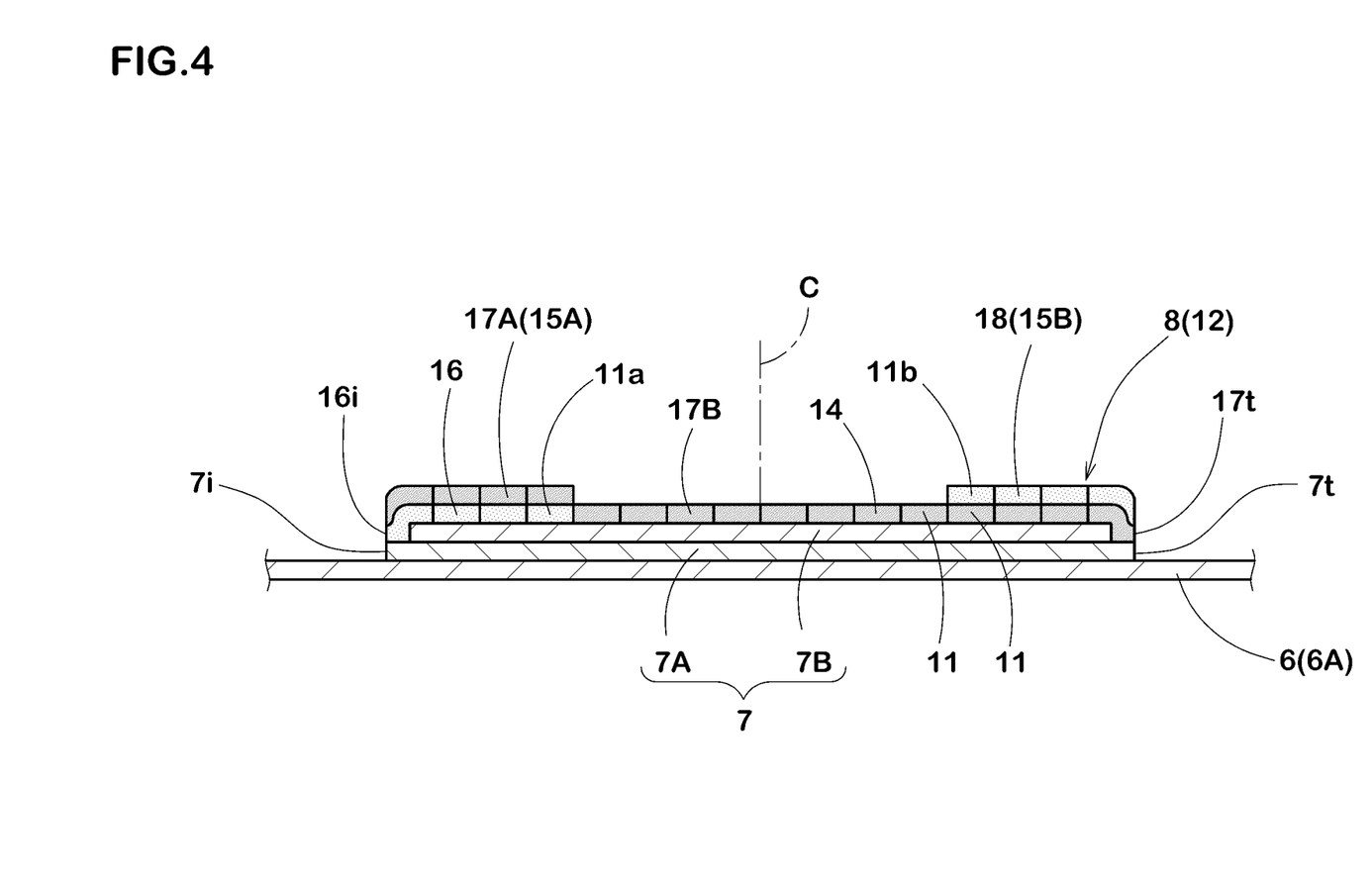

In FIG. 4, A-A cross section of FIG. 3 is shown including the carcass ply 6A and the belt plies 7A, 7B.

As shown in FIGS. 3 and 4, the band layer 8 is made up of a jointless ply 12 formed by spirally winding a long band-like ply 11 (shown in FIG. 2) on the outside of the belt layer 7.

As shown in FIG. 2, the band-like ply 11 has a narrow width ribbon-like shape having a substantially rectangular cross section in which one or more of the band cords 9 arranged parallel at substantially equal intervals are coated with topping rubber 10.

It is desirable that the width W1 of the band-like ply 11 is, for example, 3.0 to 15.0 mm.

If the width W1 is less than 3.0 mm, the number of the windings of the band-like ply 11 required to form the jointless ply 12 becomes increased, and the productivity is likely to decrease. On the contrary, if more than 15.0 mm, there is a tendency that wrinkles are likely to occur during the winding operation.

To ensure the durability of the tire and the workability of the winding in good balance, it is preferred that the thickness t of the band-like ply 11 is 0.6 to 1.5 mm.

From the same point of view, it is preferable that the number of the band cords 9 included in one band-like ply 11 is 3 to 14.

As shown in FIG. 3 and FIG. 4, the jointless ply 12 is made up of a first ply portion 16, a second ply portion 17 wider than the first ply portion 16, and a third ply portion 18 narrower than the second ply portion 17.

In FIG. 4, the cross sections of the second ply portion 17 and the first and third ply portions 16, 18 are distinguished by grayscale for convenience sake.

The first ply portion 16 is formed by continuously winding the band-like ply 11 from a starting end 11a positioned between the tire equator C and one axial end 7i of the belt layer 7 to a position on the one axial end 7i of the belt layer 7.

The second ply portion 17 is formed by continuously winding the band-like ply 11 from a position on one axial end 16i of the first ply portion 16 to the other axial end 7t of the belt layer 7.

The third ply portion 18 is formed by continuously winding the band-like ply 11 from a position on the other axial end 17t of the second ply portion 17, toward the tire equator c, to a terminal end 11b between the other axial end 17t of the second ply portion 17 and the tire equator C.

That is, in this embodiment, one edge band ply 15A is formed by a part 17A of the second ply portion 17 lapping over the first ply portion 16 in the tire radial direction. The other edge band ply 15B is formed by the third ply portion 18. The full band ply 14 is formed by the first ply portion 16 and a part 17B of the second ply portion 17 other than the part 17A (the part 17B disposed on the other axial end side of the first ply portion 16).

Moreover, the band-like ply 11 is continuous from the starting end 11a of the first ply portion 16 to the terminal end 11b of the third ply portion 18 without interruption.

Thus, at the both ends of the jointless ply 12 (shown in FIG. 2), the band cords 9 are continued without interruption. For this reason, the binding force of the belt layer 7 is further increased, and the durability of the tire is further improved.

The side edge 11e of the band-like ply 11 contacts with the axially adjacent side edge 11e of the band-like ply 11. Thereby, the band layer 8 gives a uniform restraining force to the belt layer 7, and further improves the durability.

The widths Wc in the tire axial direction of the first ply portion 16 and the third ply portion 18 (shown in FIG. 1) are preferably 10 to 60 mm.

Thus, the lifting of the belt layer 7 can be effectively prevented, while suppressing an increase in the tire weight.

As shown in FIG. 3, the jointless ply 12 comprises circumferential-direction parts 20 in which the band-like ply 11 is wound parallel to the tire circumferential direction, and inclined parts 21 continued from the circumferential-direction parts 20 and inclined with respect to the tire circumferential direction.

Such inclined parts 21 cause the circumferential-direction parts 20 shift in the tire axial direction corresponding to a spiral pitch at each time the band-like ply 11 goes round.

The inclined part 21 in this embodiment cause the circumferential-direction parts 20 shift in the tire axial direction corresponding to a spiral pitch which is equal to the width W1 of the band-like ply 11.

Thereby, it is possible to mutually contact the side edges 11e of the band-like ply 11 which are adjacent in the tire axial direction.

In this embodiment, the first ply portion 16, the second ply portion 17 and third ply portion 18 are each provided with the circumferential-direction parts 20 and the inclined parts 21.

The inclined parts 21 of the first ply portion 16 lap over the parallel parts 20 of the second ply portion 17 in the tire radial direction.

Further, the inclined parts 21 of the second ply portion 17 lap over the parallel parts 20 of the first ply portion 16 and the parallel parts 20 of the third ply portion 18 in the tire radial direction.

Further, the inclined parts 21 of the third ply portion 18 lap over the parallel part 20 of the second ply portion 17 in the tire radial direction.

As the inclined parts 21 lap over the parallel parts 20 in this way, the influence of the inclined parts 21 upon the binding force is suppressed.

Figure 7:
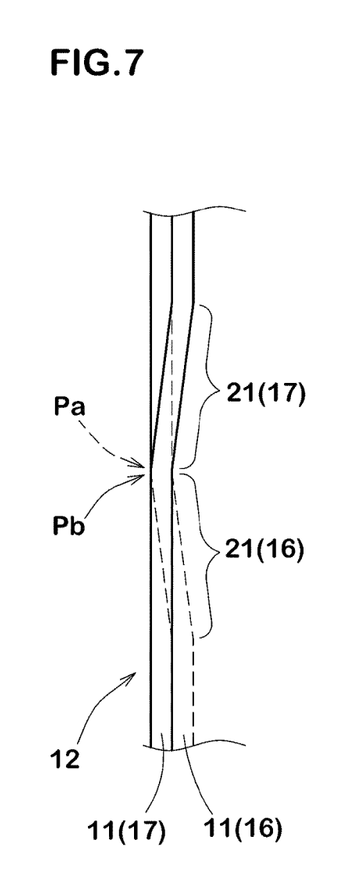

In this embodiment, as shown in FIG. 7, the inclined part 21 of the first ply portion 16 and the inclined part 21 of the second ply portion 17 which is disposed radially outside the first ply portion 16 are arranged in a v-shape continuous in the tire circumferential direction. In other words, the end position Pa of the inclined part 21 of the first ply portion 16 which end position is on one side in the tire circumferential direction coincides with the end position Pb of the inclined part 21 of the second ply portion 17 which end position is on the other side in the circumferential direction.

Similarly, the inclined part 21 of the second ply portion 17 and the inclined part 21 of the third ply portion 18 which is disposed radially outside the second ply portion 17 are arranged in a v-shape continuous in the tire circumferential direction although not shown. In other words, the end position Pa of the inclined part 21 of the second ply part 17 which end position is on one side in the tire circumferential direction coincides with the end position Pb of the inclined part 21 of the third ply section 18 which end position is on the other side in the tire circumferential direction Thereby, the band layer 8 having a more evened thickness can be formed, and it is possible to generate a uniform restraining force.

Figure 8:
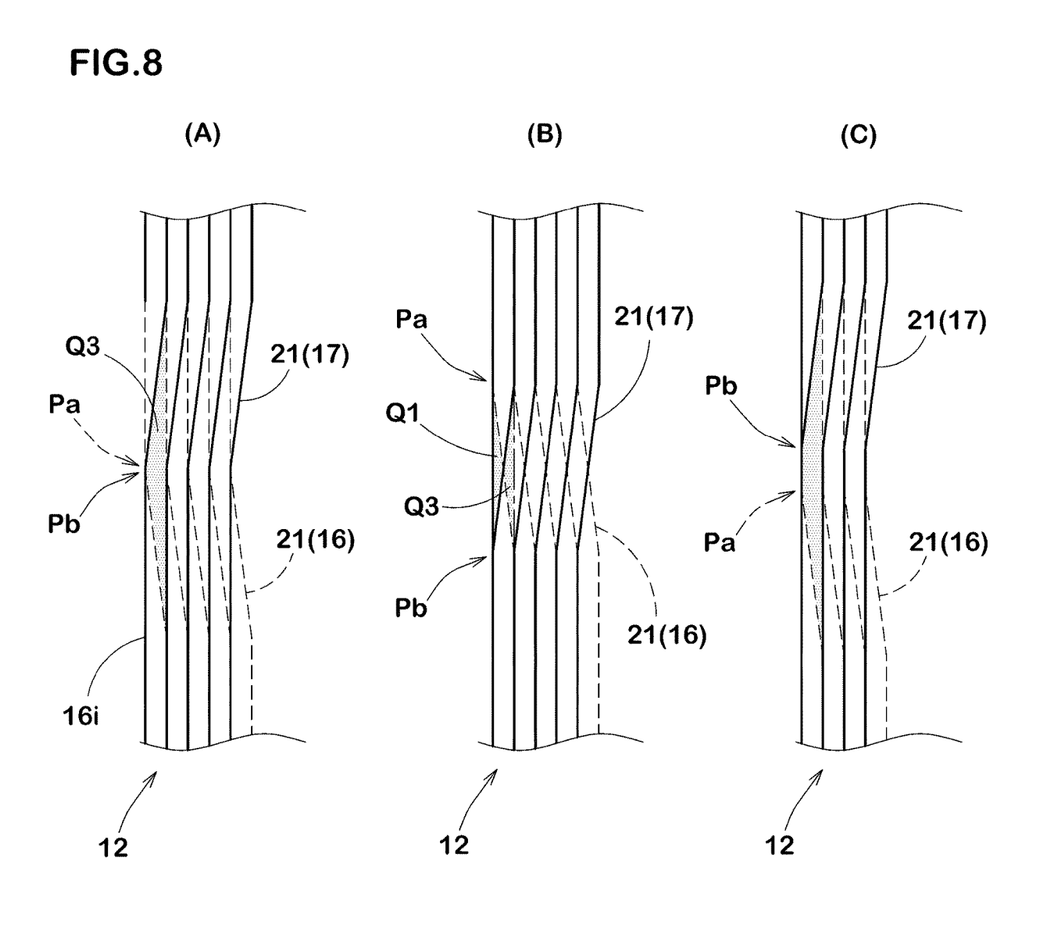

If the inclined part 21 of the first ply portion 16 intersects the inclined part 21 of the second ply portion 17 in an x-shape as shown in FIG. 8 (B), a single-layered part Q1 and a three-layered part Q3 which are adjacent to each other are formed at the outer edge of the jointless ply 12. Therefore, this position becomes a weak point, leading to a tendency toward deterioration in the durability.

In contrast, if the end position Pa overlaps the end position Pb as shown in FIG. 8 (A) (namely, if the inclined parts 21, 21 are arranged in a v-shape), only the three-layered part Q3 is formed at the outer edge of the jointless ply 12, therefore, the deterioration in the durability can be suppressed.

If the end position Pa and the end position Pb are spaced from each other in the circumferential direction as shown in FIG. 8 (C), the three-layered part Q3 becomes large, leading to a disadvantage for uniformity.

In this embodiment, in order for the binding force to be uniformed, the starting end 11a of the band-like ply 11 is formed as an oblique side E parallel with the inclined part 21, and the oblique side E is brought into contact with the side edge 11e of the inclined part 21 of the first ply portion 16 on the most tire equator C side as shown in FIG. 3, Similarly, the starting end 11b of the band-like ply 11 is formed as an oblique side E parallel with the inclined part 21, and the oblique side E is brought into contact with the side edge 11e of the inclined part 21 of the third ply part 18 on the most tire equator C side.

The angle α of the inclined part 21 with respect to the tire circumferential direction is preferably 0.1 to 2.0 degrees. If the angle α of the inclined part 21 is less than 0.1 degrees, the circumferential length of the circumferential-direction part 20 becomes increased, and there is a possibility that the restraining force to the belt layer 7 is decreased.

If the angle α of the inclined part 21 is more than 2.0 degrees, the bent angle of the band cords 9 becomes increased, and there is a possibility that corrugation and the like occurs in the band-like ply 11, and the band layer 8 can not be accurately formed.

Figure 5:
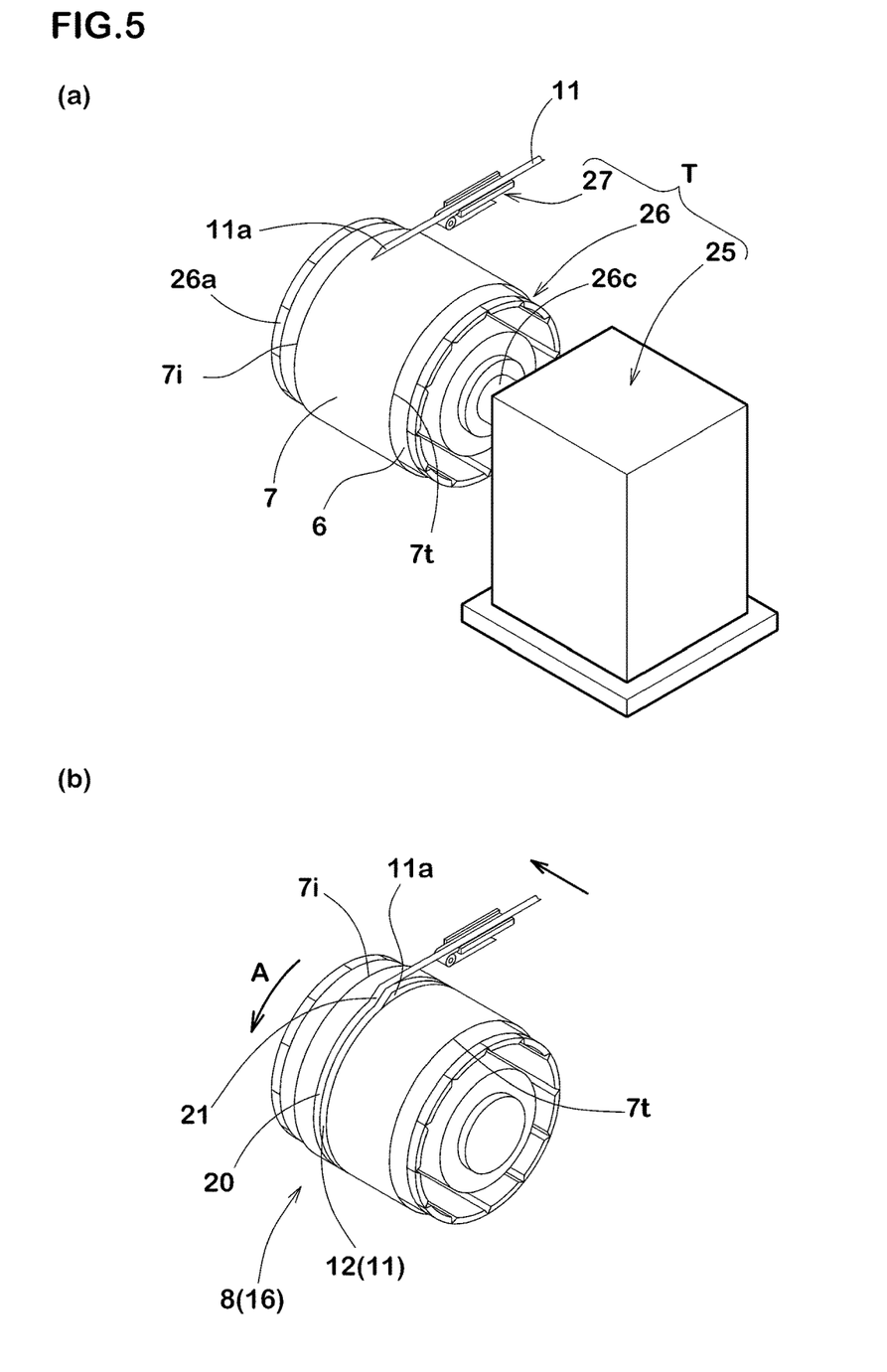
FIG. 5 a diagram for explaining a manufacturing method according to the present invention FIG. 6 a diagram for explaining a manufacturing method according to the present invention FIG. 7 a conceptual diagram showing a positional relationship between the inclined parts of the first ply portion and the second ply portion FIG. 8 (A)-(C) are conceptual diagrams showing differences in the stacked state due to positional relations between the inclined parts of the first ply portion and the inclined parts of the second ply portion.
Figure 6:
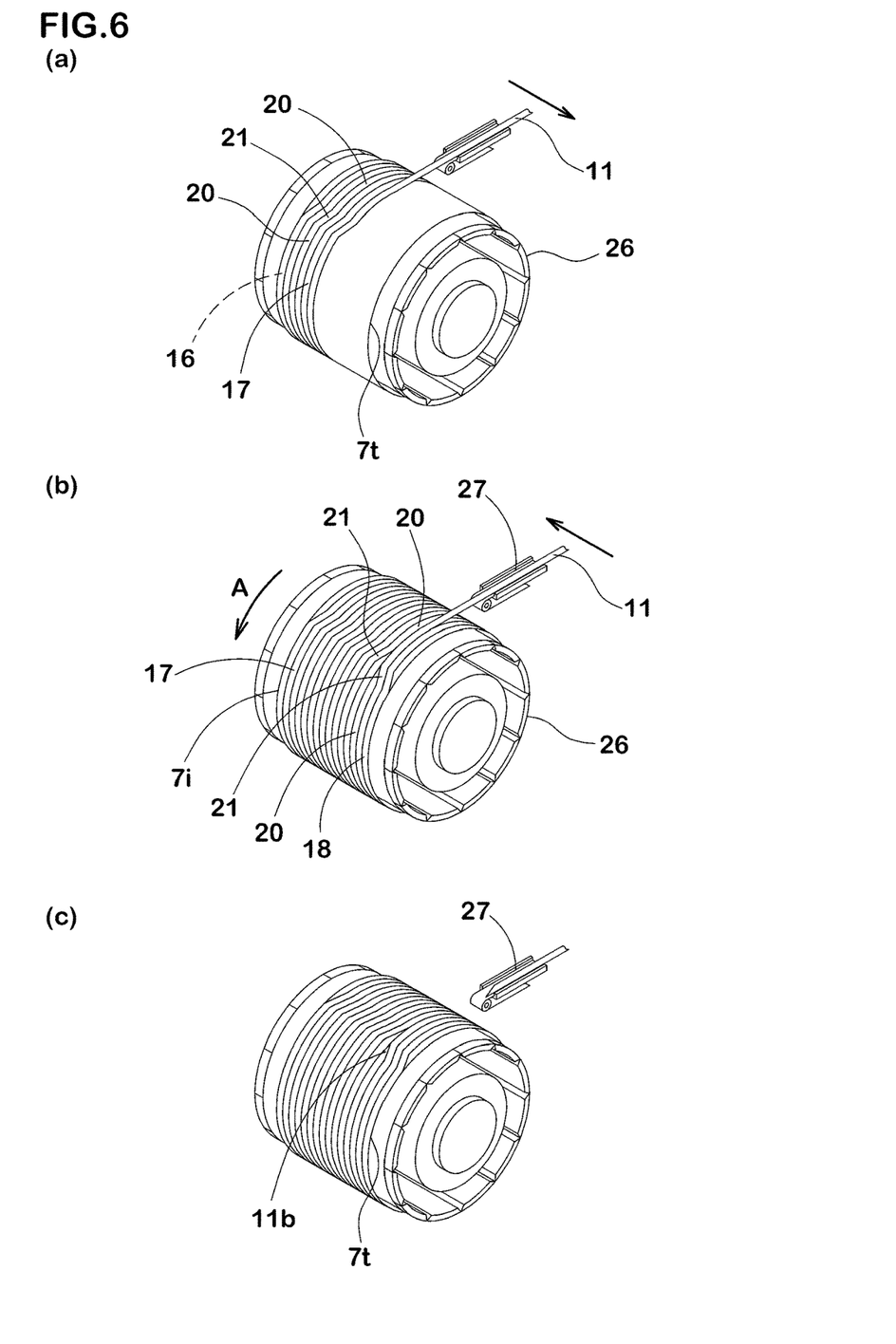

In FIG. 5 and FIG. 6, there is conceptually shown an example of a method for manufacturing the band layer 8 of the tire in this embodiment.

As shown in FIG. 5 (a), a manufacturing apparatus T is used in this manufacturing method.

The manufacturing apparatus T in this embodiment comprises a base 25, a drum 26 rotatably supported by the base 25, and an applicator 27 capable of supplying the band-like ply 11 to the drum 26.

As the drum, a substantially cylindrical one is shown for convenience sake. But, it may be a core having a substantially same shape as the inner surface of the tire.

The base 25 comprises a power transmission device and the like (not shown) for rotating the drum 26 through a rotary shaft 26c.

The applicator 27 is composed of a conveyor, for example, and supplies the band-like ply 11 in the circumferential direction onto the outer peripheral surface 26a of the drum 26. On the upstream side of the applicator 27, a rubber extruder for continuously extruding the band-like ply 11 is provided (not shown). Thus, the band-like ply 11 is continuously supplied from the applicator 27.

The applicator 27 is supported by, for example, a three-dimensional moving apparatus (not shown) capable of reciprocating in the axial direction and in the radial direction of the drum 26 relatively to the drum 26.

The band layer forming step for forming the band layer 8 in this embodiment is as follows.

First, there is prepared the drum 26 on the outer peripheral surface 26a of which the carcass 6 and the belt layer 7 are wound.

Incidentally, the carcass 6 and belt layer 7 may be manufactured by using the manufacturing apparatus T in this embodiment.

Then, a first step for forming the first ply portion 16 is performed.

First, the starting end 11a of the band-like ply 11 guided by the applicator 27 is stuck at a position on the outer peripheral surface 26a and between the tire equator C and the one axial end 7i of the belt layer 7.

In order to reliably stick the band-like ply 11, it is desirable to use a pressing rollers (not shown) for example.

Next, as shown in FIG. 5 (b), the drum 26 is rotated (arrow direction A), while the applicator 27 is fixed to form the circumferential-direction part 20.

Further, the inclined part 21 of the first ply portion 16 is formed by moving the applicator 27 toward the one axial end 7i of the belt layer 7 (arrow direction).

In this way, the fixing and moving of the applicator 27 are repeated, while rotating the drum 26, thereby, the circumferential-direction parts 20 and the inclined parts 21 are alternately formed.

Incidentally, the circumferential length of the inclined part 21 of the band-like ply 11 can be adjusted by adjusting the moving speed of the applicator 27 in the tire axial direction or the rotational speed of the drum 26.

Next, as shown in FIG. 6 (a), after the first step, without cutting the band-like ply 11, the second step for forming the second ply portion 17 is performed.

In the second step, the applicator 27 is moved toward the other end 7t in the tire axial direction of the belt layer 7 (arrow direction).

In the second step too, the fixing and the moving of the applicator 27 are repeated while rotating the drum 26 so as to form the circumferential-direction parts 20 and the inclined parts 21 of the second ply portion 17 alternately.

Next, as shown in FIG. 6 (b), after the second step, without cutting the band-like ply 11, the third step for forming the third ply portion 18 is performed.

In the third step, the applicator 27 is moved toward one end 7i in the tire axial direction of the belt layer 7 (arrow direction).

In the third step too, the fixing and the moving of the applicator 27 are repeated while rotating the drum 26 so as to form the circumferential-direction parts 20 and the inclined parts 21.

Finally, as shown in FIG. 6 (c), the terminal end 11b of the band-like ply 11 which guided by the applicator 27 is stuck at a position between the tire equator C and the other end 7t side in the tire axial direction of the belt layer 7.

Thus, in this embodiment, the band-like ply 11 which is continuous from the starting end 11a of the first ply portion 16 to the terminal end 11b of the third ply portion 18 is used, and the band layer 8 is formed.

In order to prevent the band-like ply 11 from wrinkling and falling off from the drum 26, it is desirable that the drum 26 is continuously rotated from the first step to the third step so as to give tension to the band-like ply 11 supplied from the applicator 27.

While detailed description has been made of the pneumatic tire and the manufacturing method therefor according to the present invention, the present invention can be embodied in various forms without being limited to the above illustrated embodiments.

WORKING EXAMPLE

Based on the specifications shown in Table 1, slick type pneumatic racing tires of size 330/710R18 having the basic structure shown in FIG. 1 were experimentally manufactured, and each test tire was tested for the durability.

Common specifications to all of the test tires and test methods are as follows.

The width Wa of the inside belt ply: 320 mm
The width Wb of the outside belt ply: 310 mm
The widths Wc of the first ply portion and third ply portion: 40 mm
The width Wd of the second ply portion: 320 mm
<Durability>

Using a 1.7 meter diameter drum, high-speed running test machine, each test tire was run under the following conditions, and the running time until damage occurred in the vicinity of the shoulder of the tread portion, and the surface temperature when the damage occurred, were measured.

The results are indicated by the measured values.
In ply running time, the larger value is better.
In the surface temperature, the smaller value is better.
In the comparative example tire, the first ply portion, the second ply portion, and the third ply portion are formed by using separate band-like plies.
Rim (all-wheels): width 13 inches, diameter 18 inches
Inner pressure (all-wheel): 1.8 MPa
load (front wheel): 5.9 kN
speed of tire: 250 km/h
applicator: single
The test results are shown in Table 1.

TABLE 1

|  | working example | comparative example |
|---|---|---|
| number of band-like ply | 1 | 3 |
| running time until damage [minute, lager value is better] | 60 | 15 |
| surface temperature when damage occurred [degree C., lager value is better] | 98 | 102 |

From the test results, it was confirmed that the working example tire had excellent durability as compared with the comparative example.

DESCRIPTION OF THE SIGNS 7 belt layer
8 band layer
11 band-like ply
11a starting end
11b terminal end
12 jointless ply
16 first ply portion
17 second ply portion
18 third ply portion
C tire equator

The invention claimed is:

1. A pneumatic tire comprising:
a carcass extending from a tread portion to a bead core of a bead portion through a sidewall portion,
a belt layer disposed in the tread portion and radially outside the carcass, and
a band layer disposed radially outside the belt layer, wherein:
the band layer includes a jointless ply formed by spirally winding, on the radially outside of the belt layer, a long band-like ply of one or more band cords coated with topping rubber,
the jointless ply includes
a first ply portion in which the band-like ply is wound from a starting end which is positioned between the tire equator and one end in the tire axial direction of the belt layer, to a position on the one end in the tire axial direction of the belt layer,
a second ply portion in which the band-like ply is wound from the position on the one end in the tire axial direction of the first ply portion, to a position on the other end in the tire axial direction of the belt layer, and
a third ply portion in which the band-like ply is wound toward the tire equator from the position on the other end in the tire axial direction of the second ply portion, to a terminal end which is between the other end in the tire axial direction of the second ply and the tire equator,
the band-like ply is continued from the starting end of the first ply portion to the terminal end of the third ply portion without interruption,
the first ply portion is composed of windings of the band-like ply, and the first ply portion is made up of
a first inclined part as a part in the tire circumferential direction, extending from a first circumferential end thereof to a second circumferential end thereof in a first circumferential direction, in which the windings are inclined with respect to the tire circumferential direction to the same direction, and a first circumferential part in which the windings are substantially parallel with the tire circumferential direction, the second ply portion is composed of windings of the band-like ply, and the second ply portion is made up of a second inclined part as a part in the tire circumferential direction, extending from a first circumferential end thereof to a second circumferential end thereof in said first circumferential direction, in which the windings are inclined with respect to the tire circumferential direction to the same direction, and a second circumferential part in which the windings are substantially parallel with the tire circumferential direction, the third ply portion is composed of windings of the band-like ply, and the third ply portion is made up of a third inclined part as a part in the tire circumferential direction, extending from a first circumferential end thereof to a second circumferential end thereof in said first circumferential direction, in which the windings are inclined with respect to the tire circumferential direction to the same direction, and a third circumferential part in which the windings are substantially parallel with the tire circumferential direction, the windings in the second inclined part are inclined to an opposite direction to the windings in the first inclined part and the windings in the third inclined part, the windings in the first inclined part are radially inner windings, the windings in the second inclined part include radially inner windings and radially outer windings, and the windings in the third inclined part are radially outer windings, the first inclined part and the radially outer windings of the second inclined part are positioned in the tire circumferential direction so that a position of the first circumferential end of the first inclined part coincides with a position of the second circumferential end of the second inclined part, whereby the radially inner windings of the first inclined part and the radially outer windings of the second inclined part form V-formations, and the radially inner windings of the second inclined part and the third inclined part are positioned in the tire circumferential direction so that a position of the second circumferential end of the third inclined part coincides with a position of the first circumferential end of the second inclined part, whereby the radially inner windings of the second inclined part and the radially outer windings of the third inclined part form V-formations.

2. The pneumatic tire as set forth in claim 1, wherein side edges of the band-like ply adjacent in the tire axial direction are in contact with each other.

3. The pneumatic tire as set forth in claim 1, wherein an axially outer edge of the band layer coincides with an axially outer edge of the belt layer.

4. The pneumatic tire as set forth in claim 1, wherein the axial widths of the first ply portion and the third ply portion are 10 to 60 mm.

5. The pneumatic tire as set forth in claim 1, wherein the band-like ply has a width of 3.0 to 15.0 mm, and a thickness of 0.6 to 1.5 mm, and an elongation of the band cord at a load of 66 N is 0.7% to 22.0%.

6. A method for manufacturing a pneumatic tire, wherein the pneumatic tire comprises: a carcass extending from a tread portion to a bead core of a bead portion through a sidewall portion, a belt layer disposed in the tread portion and radially outside the carcass, and a band layer disposed radially outside the belt layer, wherein: the band layer includes a jointless ply formed by spirally winding, on the radially outside of the belt layer, a long band-like ply of one or more band cords coated with topping rubber, the jointless ply includes a first ply portion in which the band-like ply is wound from a starting end which is positioned between the tire equator and one end in the tire axial direction of the belt layer, to a position on the one end in the tire axial direction of the belt layer, a second ply portion in which the band-like ply is wound from the position on the one end in the tire axial direction of the first ply portion, to a position on the other end in the tire axial direction of the belt layer, and a third ply portion in which the band-like ply is wound toward the tire equator from the position on the other end in the tire axial direction of the second ply portion, to a terminal end which is between the other end in the tire axial direction of the second ply and the tire equator, the band-like ply is continued from the starting end of the first ply portion to the terminal end of the third ply portion without interruption, the first ply portion is composed of windings of the band-like ply, and the first ply portion is made up of a first inclined part as a part in the tire circumferential direction, extending from a first circumferential end thereof to a second circumferential end thereof in a first circumferential direction, in which the windings are inclined with respect to the tire circumferential direction to the same direction, and a first circumferential part in which the windings are substantially parallel with the tire circumferential direction, the second ply portion is composed of windings of the band-like ply, and the second ply portion is made up of a second inclined part as a part in the tire circumferential direction, extending from a first circumferential end thereof to a second circumferential end thereof in said first circumferential direction, in which the windings are inclined with respect to the tire circumferential direction to the same direction, and a second circumferential part in which the windings are substantially parallel with the tire circumferential direction, the third ply portion is composed of windings of the band-like ply, and the third ply portion is made up of a third inclined part as a part in the tire circumferential direction, extending from a first circumferential end thereof to a second circumferential end thereof in said first circumferential direction, in which the windings are inclined with respect to the tire circumferential direction to the same direction, and a third circumferential part in which the windings are substantially parallel with the tire circumferential direction, the windings in the second inclined part are inclined to an opposite direction to the windings in the first inclined part and the windings in the third inclined part, the windings in the first inclined part are radially inner windings, the windings in the second inclined part include radially inner windings and radially outer windings, and the windings in the third inclined part are radially outer windings, the first inclined part and the radially outer windings of the second inclined part are positioned in the tire circumferential direction so that a position of the first circumferential end of the first inclined part coincides with a position of the second circumferential end of the second inclined part, whereby the radially inner windings of the first inclined part and the radially outer windings of the second inclined part form V-formations, and the radially inner windings of the second inclined part and the third inclined part are positioned in the tire circumferential direction so that a position of the second circumferential end of the third inclined part coincides with a position of the first circumferential end of the second inclined part, whereby the radially inner windings of the second inclined part and the radially outer windings of the third inclined part form V-formations, the method comprising: a band layer forming step in which the band-like ply is spirally wound on the radially outside of the belt layer, wherein: said band layer forming step includes a first step of forming the first ply portion, a second step of forming the second ply portion after the first step, and a third step of forming the third ply portion after the second step, and the forming is made by the use of the band-like ply which is continuous from the starting end of the first ply portion to the terminal end of the third ply portion.

7. The pneumatic tire as set forth in claim 2, wherein an axially outer edge of the band layer coincides with an axially outer edge of the belt layer.

8. The pneumatic tire as set forth in claim 2, wherein the axial widths of the first ply portion and the third ply portion are 10 to 60 mm.

9. The pneumatic tire as set forth in claim 3, wherein the axial widths of the first ply portion and the third ply portion are 10 to 60 mm.

10. The pneumatic tire as set forth in claim 2, wherein the band-like ply has a width of 3.0 to 15.0 mm, and a thickness of 0.6 to 1.5 mm, and an elongation of the band cord at a load of 66 N is 0.7% to 22.0%.

11. The pneumatic tire as set forth in claim 3, wherein the band-like ply has a width of 3.0 to 15.0 mm, and a thickness of 0.6 to 1.5 mm, and an elongation of the band cord at a load of 66 N is 0.7% to 22.0%.

\* \* \* \* \*